US007255326B2

(12) United States Patent
Wang

(10) Patent No.: US 7,255,326 B2
(45) Date of Patent: Aug. 14, 2007

(54) SINGLE-AND-CONTINUAL SHOT CHANGEOVER DEVICE FOR A NAILING GUN

(75) Inventor: Brian Wang, Fenyuan Shiang Changhua County (TW)

(73) Assignee: Bentley Fastening Tools Co., Ltd., Taichung (TW)

( * ) Notice: Subject to any disclaimer, the term of this patent is extended or adjusted under 35 U.S.C. 154(b) by 399 days.

(21) Appl. No.: 11/024,648

(22) Filed: Dec. 30, 2004

(65) Prior Publication Data

US 2006/0144379 A1 Jul. 6, 2006

(51) Int. Cl.
*F16K 51/00* (2006.01)

(52) U.S. Cl. ...................................... 251/234; 173/169

(58) Field of Classification Search ................ 251/234, 251/231; 173/169, 168

See application file for complete search history.

(56) References Cited

U.S. PATENT DOCUMENTS 3,610,298 A * 10/1971 Wood ......................... 251/234
6,173,747 B1 * 1/2001 Angarola et al. ........... 251/263
6,631,830 B2 * 10/2003 Ma et al. ...................... 251/75
6,832,636 B2 * 12/2004 Harrison ...................... 251/90

* cited by examiner

*Primary Examiner*—John Bastianelli
(74) *Attorney, Agent, or Firm*—Troxell Law Office, PLLC

(57) ABSTRACT

A single-and-continual shot changeover device for a nailing gun includes a trigger shaft positioned in an interior of a trigger body, a trigger inner member pivotally connected with an intermediate fitting stage of the trigger shaft, which also has two slide shaft stages at two sides of the fitting stage for two springs and two press buttons to fitting around respectively. The two press buttons are elastically pushed to shift outward to engage one of two—an upper and a lower—grooves of the two sidewalls of the trigger body. When the two press buttons are pressed inward, the trigger inner member can be shifted up and down to let the press buttons secured at either of the two limit grooves by means of the trigger shaft. Then the trigger inner member is controlled to separate or not from the safety connect rod for changing firing a single shot or continual shot.

3 Claims, 11 Drawing Sheets

SINGLE-AND-CONTINUAL SHOT CHANGEOVER DEVICE FOR A NAILING GUN

BACKGROUND OF THE INVENTION

1. Field of the Invention

This invention relates to a nailing gun, especially to one provided with a single-and-continual shot changeover device possible to be operated with easiness, steadiness and without fail.

2. Description of the Prior Art

A conventional single-and-continual shot changeover device 10 for a nailing gun shown in FIGS. 1 and 2 is arranged between an air valve switch and a safety connect rod, including a trigger 11, an eccentric adjust rod 12 and an actuating member 13. The trigger 11 is positioned at one side of the gun body to face to the air valve switch, and the eccentric adjust rod 12 consists of a press plate 121, an eccentric rod 122, a rotatable button 123 and a recover spring 124. The eccentric rod passes through the trigger 11, fixed eccentrically between the press plate 121 and the rotatable button 123, with the actuating member 13 having one end pivotally connected with the eccentric rod 122. Normally the rotatable button 123 is elastically pushed on the press plate 121 by the recover spring 124, retreating inward. So when a user pulls the rotatable button 123 to move the press plate to compress the recover spring 124, the rotatable button can be rotated for adjusting, as shown in FIG. 3, rotating the eccentric rod 112, which then rotates eccentrically to move up the actuating member 13 so that the safety connect rod alters its position reversely to the eccentric rod 112. Then the rotating button 123 is released to go back to its original position by means of the resilience of the recover spring 124, finishing changeover operation of the changeover device 10.

When the actuating member 13 is positioned at the lower location, with the contacting portion of the actuating member 13 with the safety connect rod being small, it will instantly separate from the safety connect rod to carry out a single shot action whenever the trigger 11 is pulled back for firing. On the contrary, when the actuating member 13 is positioned at an upper location, with the contact portion of the actuating member 13 with the safety connect rod increased, it does not separate from the safety connect rod whenever the trigger is pulled back for firing, so it continually fires shots, not singly.

However, in handling the conventional changeover device for a nailing gun, it cannot be done with only one hand, but it must be done with the left hand holding the grip of the nailing gun or with the nailing gun put down for properly turned over, and with the right hand pulling out the rotatable button 123 beside the trigger 1 rotated for adjusting and then released. So its handling is not so convenient, and in addition, a user is obliged to use a large force to a finger in pulling out and rotating the rotatable button 123, with its exposed portion of the rotatable button 123 being very small for avoiding accidental collision to be rotated. Therefore, the finger may be liable to be damaged on its skin in its handling.

SUMMARY OF THE INVENTION

A single-and-continual shot changeover device for a nailing gun in the invention includes a trigger shaft positioned in an interior of a trigger body, a trigger inner member pivotally connected to an intermediate fitting stage of the trigger shaft, two slide shaft stages at two sides of the intermediate fitting stage, and two springs and two press buttons respectively fitting around the two slide shaft stages. The press buttons are pushed normally outward by the springs to be secured at a lower one of two lengthwise points of the two sidewalls of the trigger body, and possible to be pressed elastically inward to separate from the trigger body and then shifted upward to be secured at an upper one of the two lengthwise points for changing the position of the two press buttons so as to shift the trigger inner member up and down and separate or not from the safety connect rod, and therefore, changing firing a single shot to continual shot or vice versa. As the two press buttons are pressed elastically inward manually and easily for shifting the trigger inner member for firing a single or continual shot, so the handling the changeover device is very stable and accurate.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
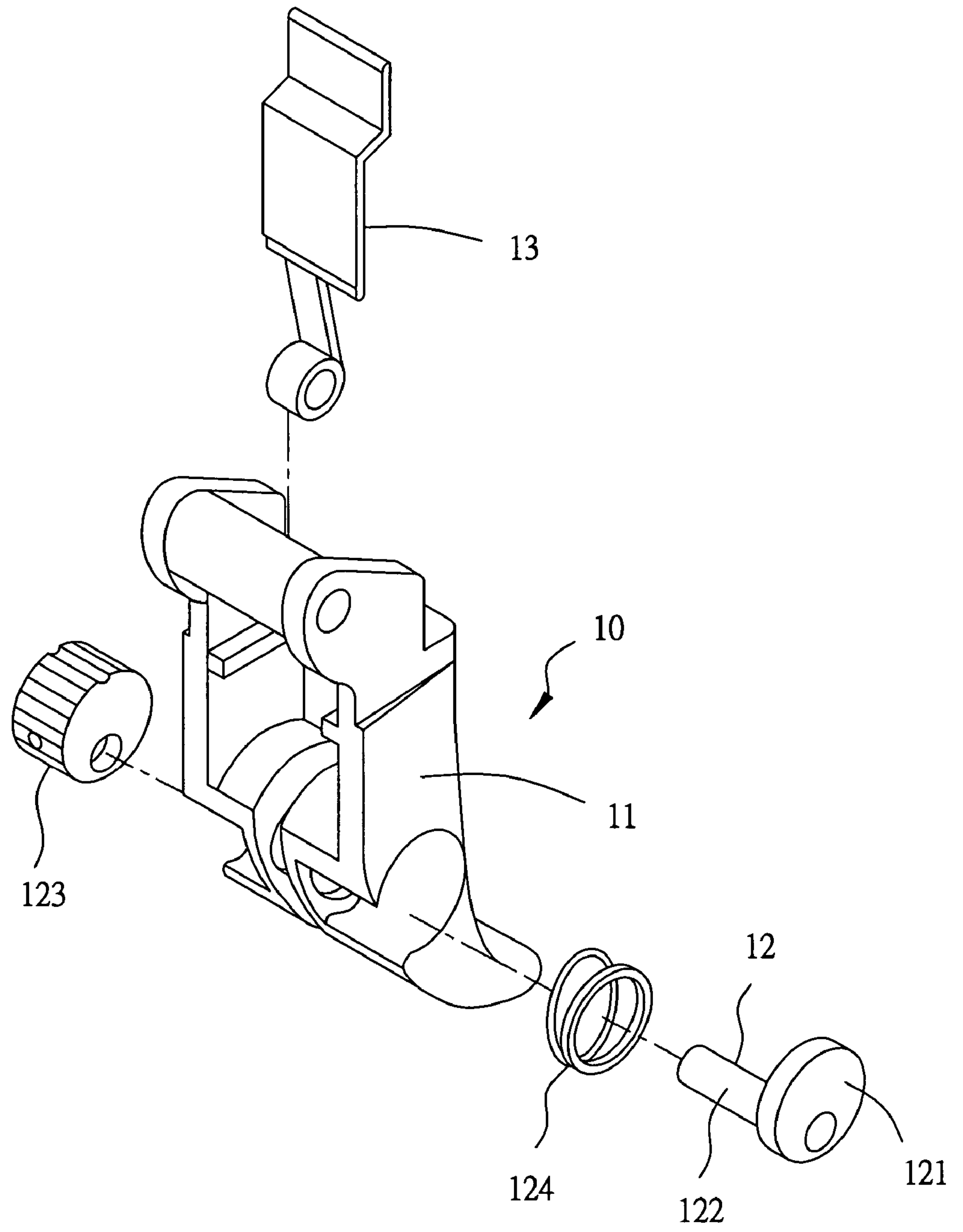
FIG. 1 is an exploded perspective view of a conventional changeover device for a nailing gun.
Figure 2:
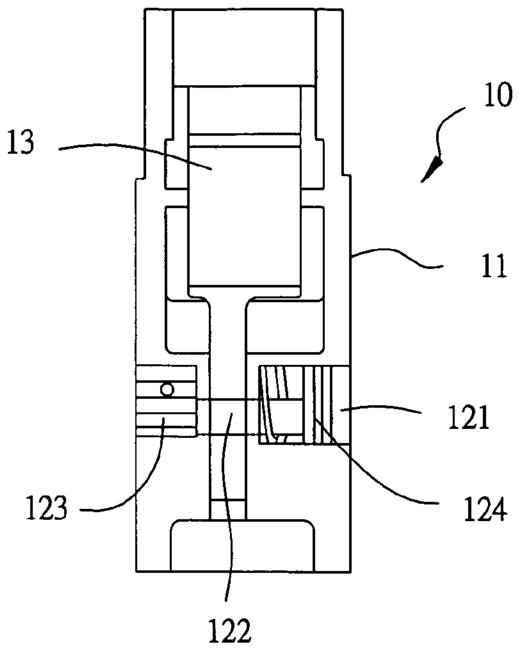
FIG. 2 is a side cross-sectional view of the conventional changeover device for a nailing gun.
Figure 3:
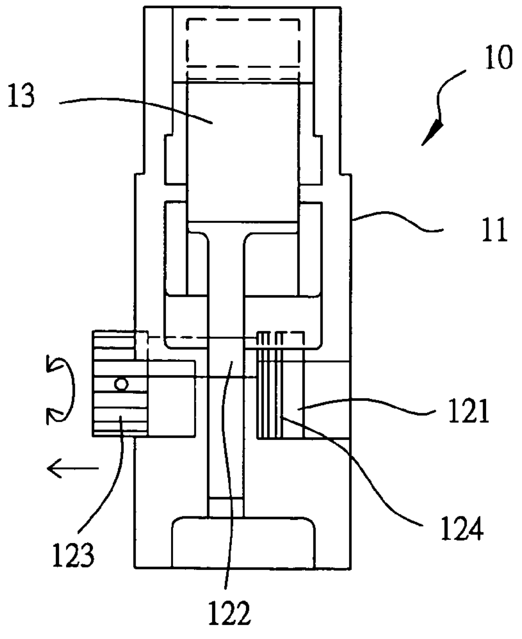
FIG. 3 is a side cross-sectional view of the conventional changeover device under an operational process.
Figure 4:
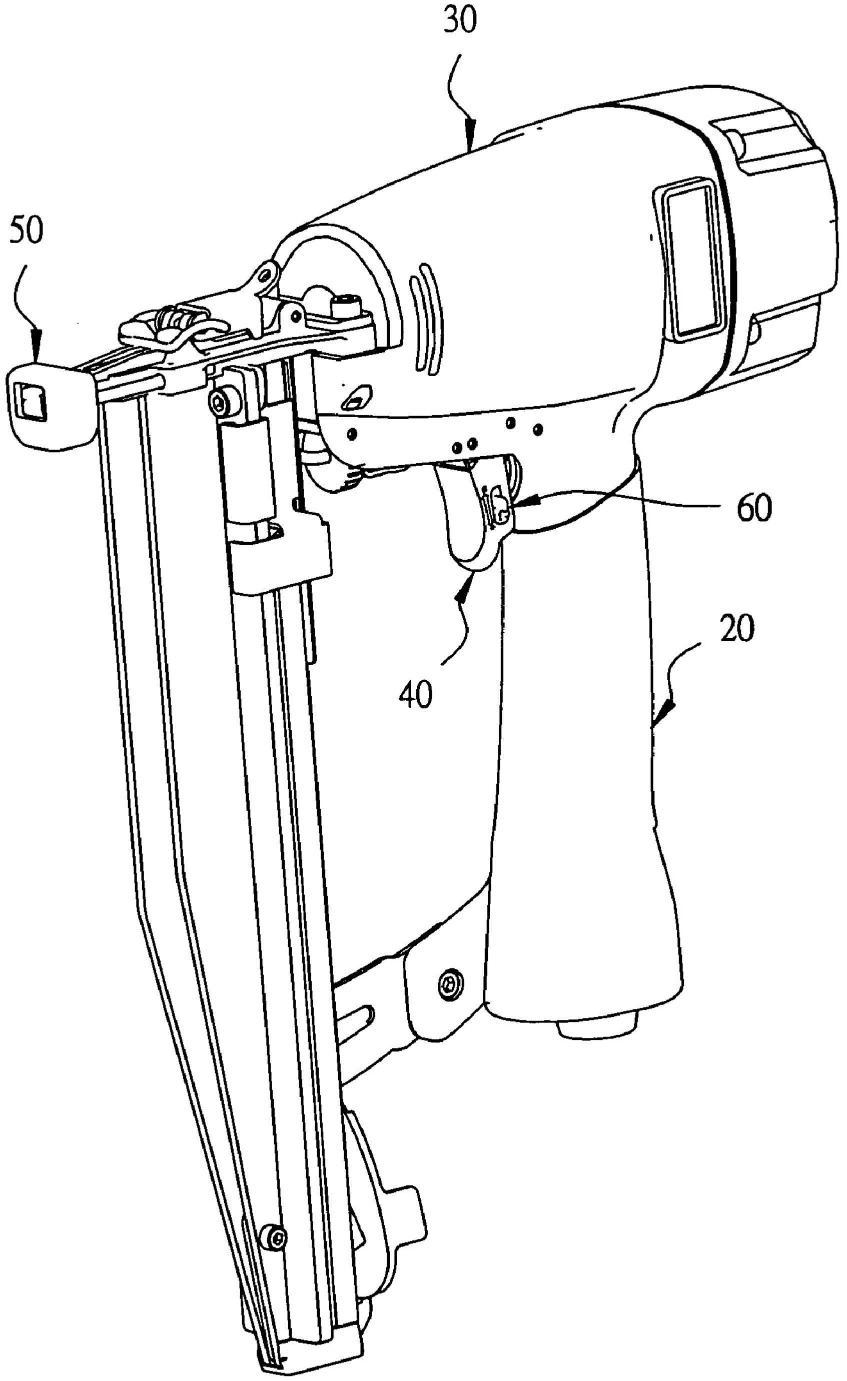
FIG. 4 is a perspective view of a nailing gun provided with a single-and-continual shot changeover device in the present invention.
Figure 5:
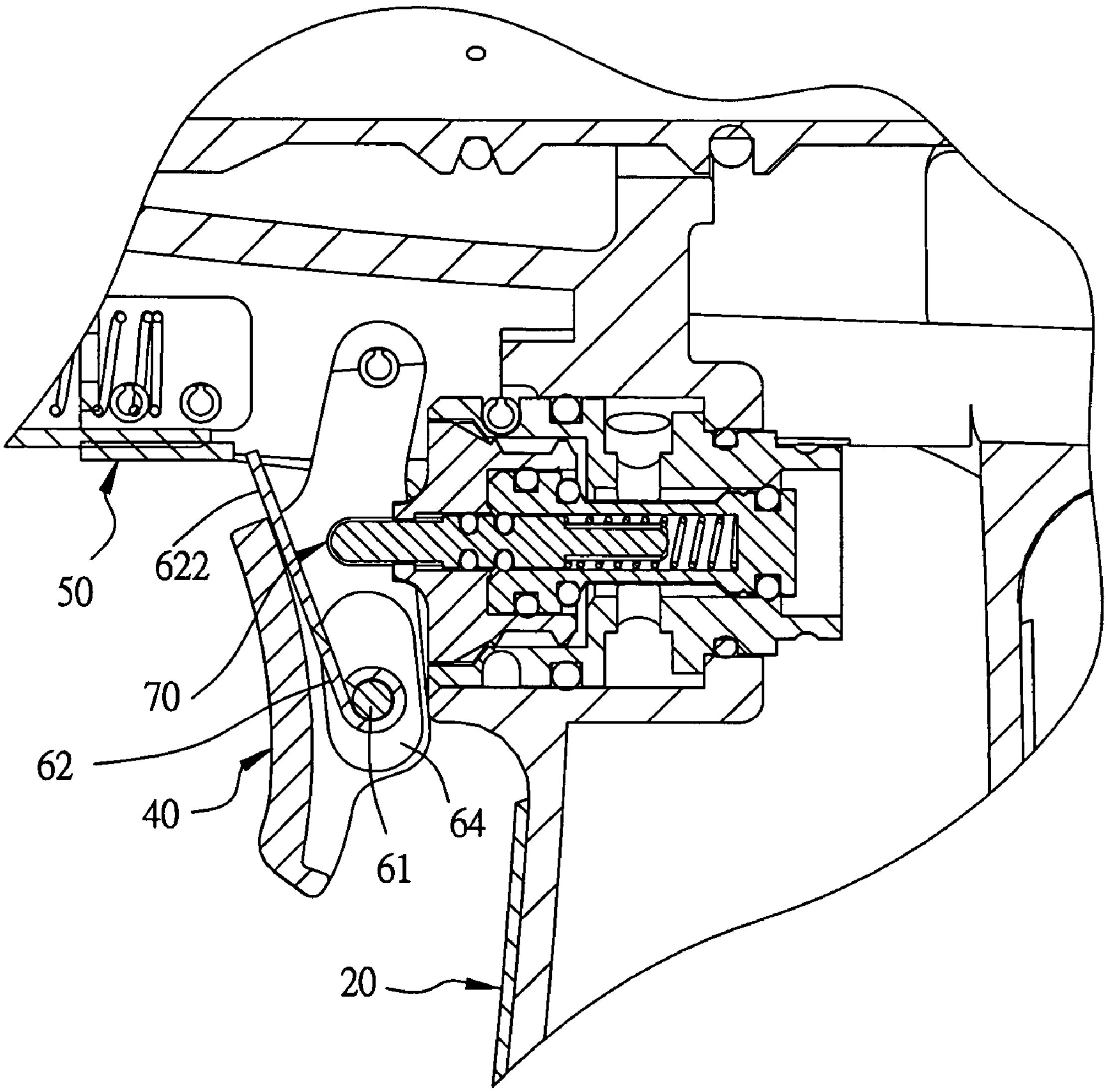
FIG. 5 is a side cross-sectional view of the single-and-continual shot changeover device for nailing gun in the present invention, showing the device in the single shot position.
Figure 6:
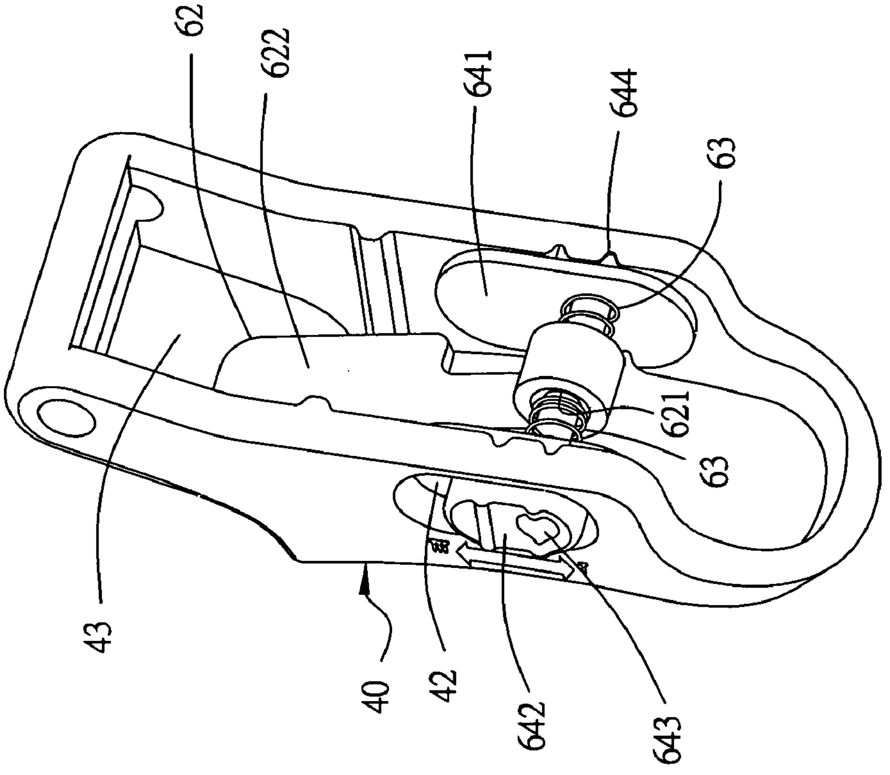
FIG. 6 is a perspective view of the single-and-continual shot changeover device in the present invention.
Figure 7:
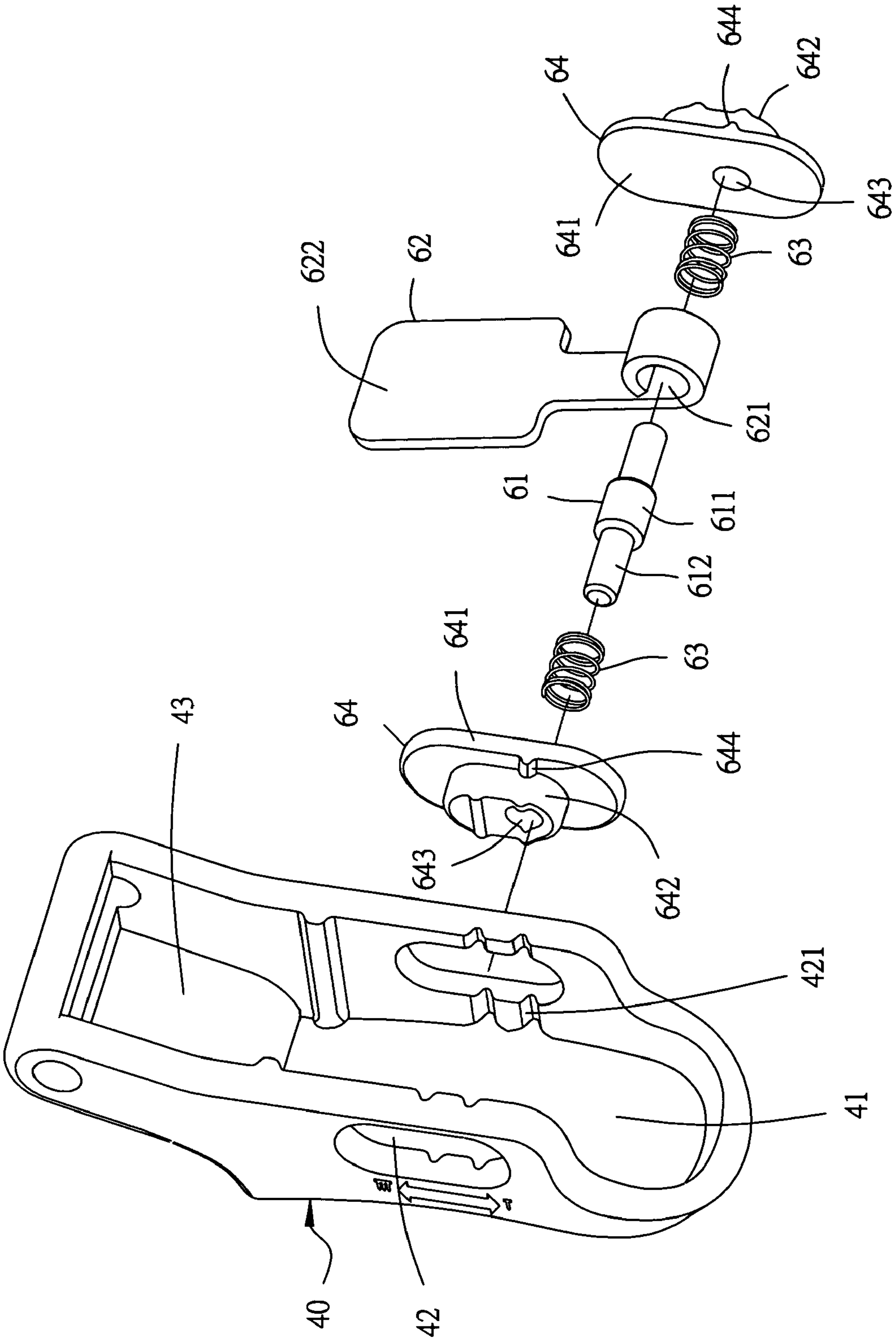
FIG. 7 is an exploded perspective view of the single-and-continual shot changeover device in the present invention.
Figure 8:
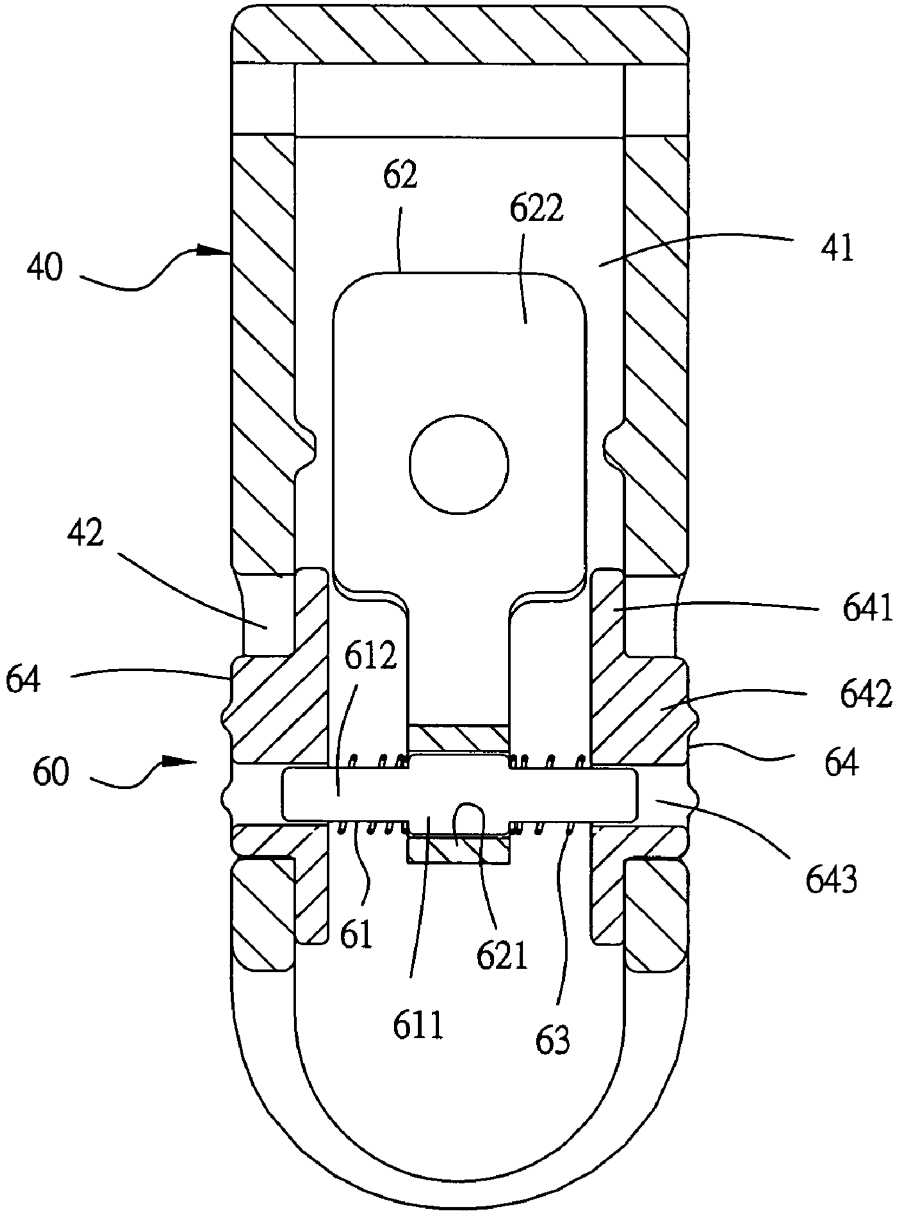
FIG. 8 is a side cross-sectional view of the single-and-continual shot changeover device in the present invention, showing the trigger body positioned at a single shot firing.

A preferred embodiment of a single-and-continual shot changeover device for a nailing gun in the present invention, as shown in FIGS. 4, 5 and 6, is constructed almost in the same way as the conventional one, except that the grip 20 of the gun body 30 of a nailing gun has a trigger body 40 pivotally connected therewith and facing to a safety connect rod 50, and the single-and-continual shot changeover device. 60 is combined with the trigger body 40 to be moved properly by the safety connect rod 50, and an air valve switch 70 for firing a shot. At the same time, the changeover switch 60 includes a trigger shaft 61, a trigger inner member 62, two springs 63 and two press buttons 64, as shown in FIGS. 7 and 8.

The trigger body 40 is provided with an inner space 41 facing on the air valve switch 70, two side-walls defining the inner space 41 and a lengthwise slide slot 42 respectively formed in each sidewall, a limit groove 421 formed at two sides of each slide slot 42, and an opening 43 formed in an upper portion of the inner space 41.

The trigger shaft 61 is fitted through transversely the trigger body 40, having two ends facing respectively the two side slots 42 of the trigger body 40 and a fitting stage 611 in an intermediate portion and a slide shaft stage 612 of a smaller diameter at two sides of the fitting stage 611.

The trigger inner member 62 has a fitting hole 621 in a lower end to pivotally combined with the fitting stage 611 of the trigger shaft 61, a flat plate member 622 formed in an upper portion and extending through the opening 43 of the trigger body 40 to turn pivotally interacted by the safety connect rod 50 for pushing the air valve switch 70 for striking a nail out.

The springs 63 are respectively fitted around the slide shaft stages 612 of the trigger shaft 61, with their inner ends urging the two sidewalls of the fitting stage 611.

The press buttons 64 respectively have a base member 641 of a comparatively large area, a projecting member 642 on an outer surface of the base member 641, and a transverse hole 643 formed through the projecting member 642 and the base member 641 and fitting around the slide stages 612 respectively so that the base member 641 may be elastically pushed by the springs 63 to rest on the inner surfaces of the two sidewalls of the trigger body 40. The projecting members 642 fit in the lengthwise slots 42 respectively. Further, the base member 641 has an engage ridge 644 at two sides of the projection members 642 to engage with one of the two limit grooves 421 of the trigger body 40 so as to limit their position when the press buttons 64 are pushed outward.

Next, how to handle the single-and-continual shot changeover device is to be described. As shown in FIG. 5, in case of single shot firing, the two press buttons 64 are made to position at a lower lengthwise position of the trigger body 40, and if the trigger body 40 is pulled back for firing, the safety connect rod 50 actuates the trigger inner member 62 to touch the air valve switch 70 and force the nailing gun to strike a nail. The moment the firing is finished, the reaction the nailing gun produced may force the safety connect rod 50 separate from the striking wall, and the trigger inner member 62 moves and separates from the safety connect rod with the trigger shaft 61 functioning as a pivot. Even though a user continues to pull back the trigger body 40 to force the safety connect rod 50 moves to the striking wall, the trigger inner member 62 is impossible to touch the air valve switch 70 for next firing, and thus only a single shot is fired out.

Figure 9A:
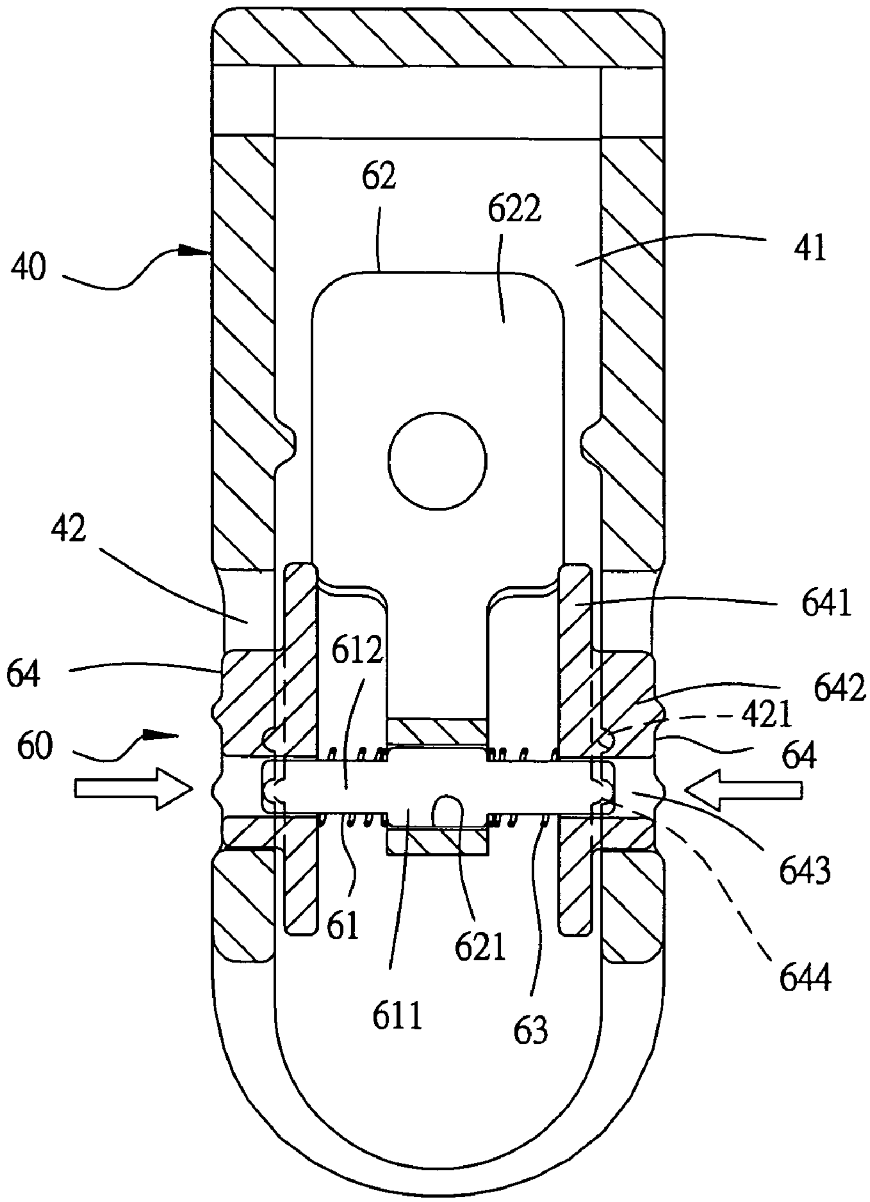
FIG. 9*a* is a side cross-sectional view of the single-and-continual shot changeover device in the present invention, showing a press button being pressed inward.
Figure 9B:
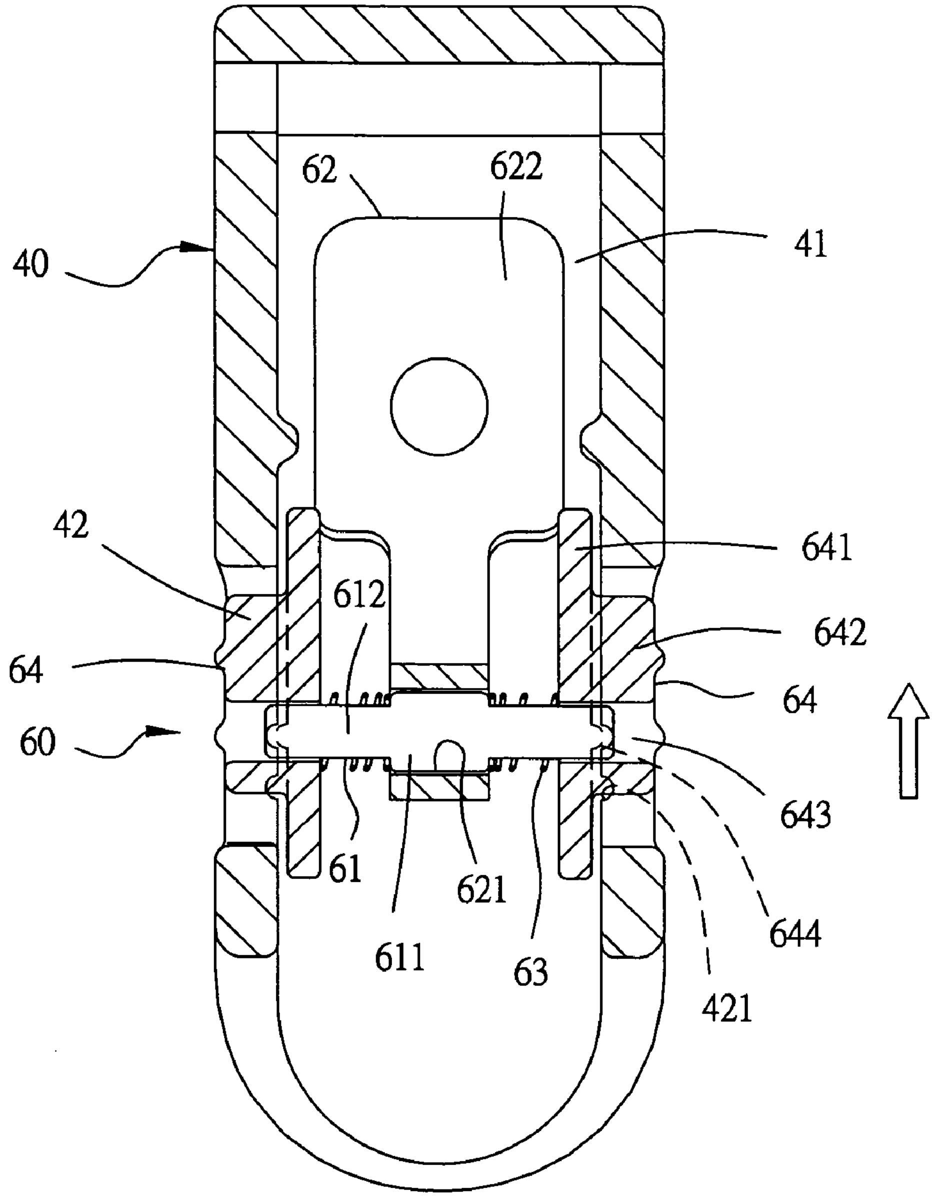
FIG. 9*b* is a side cross-sectional view of the press button and the trigger inner member with the relative components being shifted upward in the present invention.
Figure 9C:
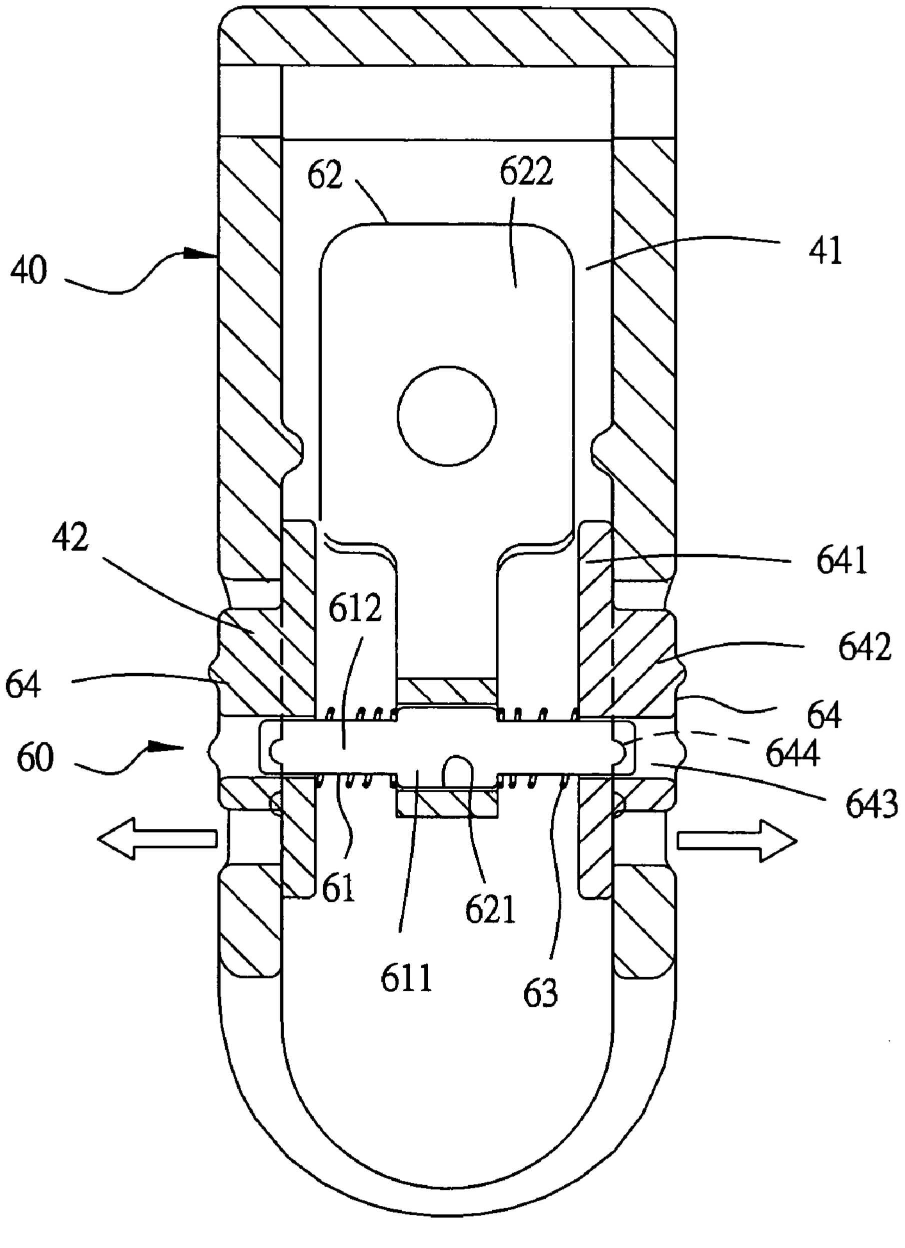
FIG. 9*c* is a side cross-sectional view of the trigger inner member adjusted in the position for continual firing in the present invention; and, FIG. 10 is a side cross-sectional view of the shingle shot changeover device positioned in a continual firing in the present invention.
Figure 10:
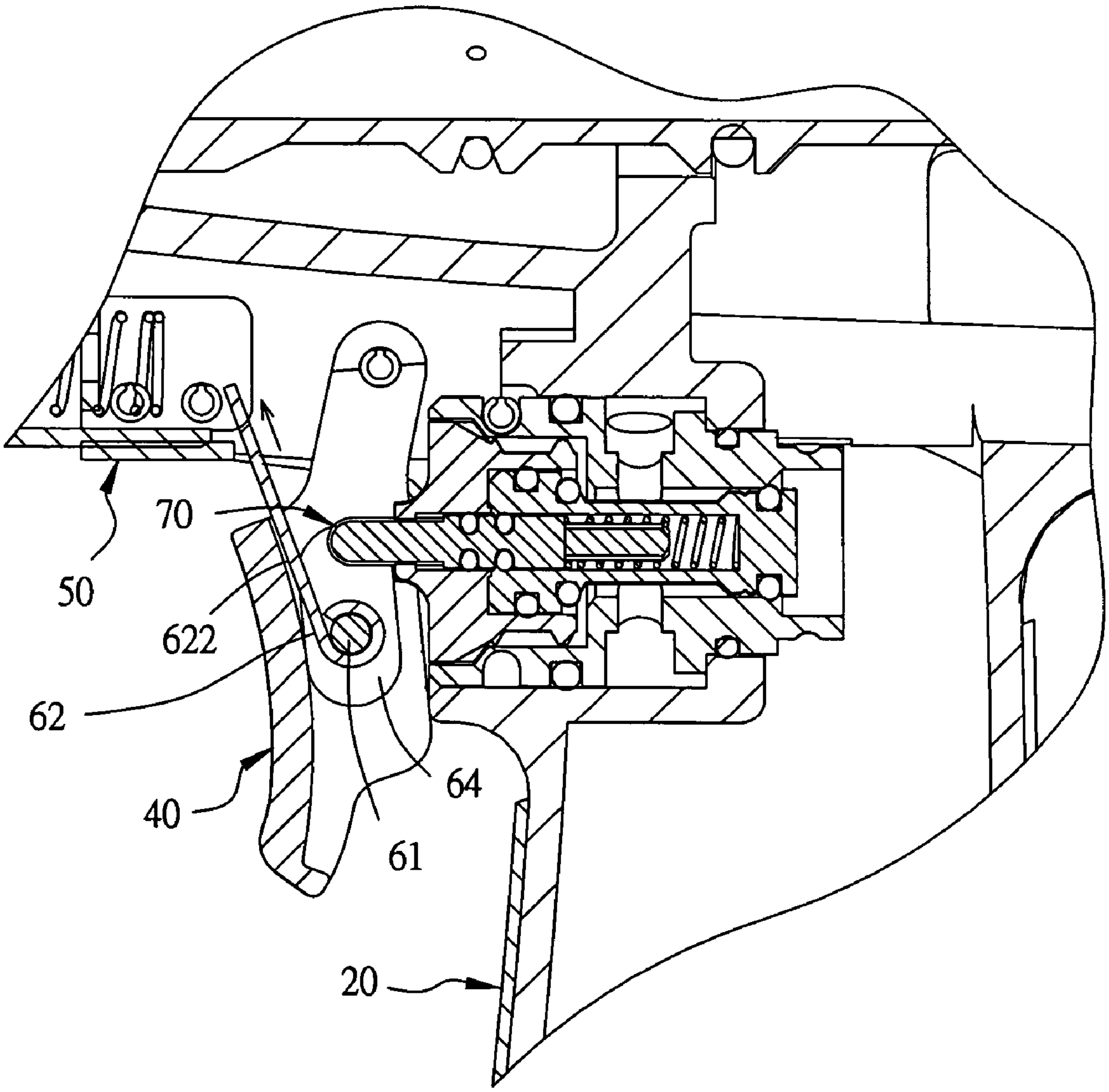

On the contrary, if a user wants to fire continually the nailing gun, the two press buttons 64 of the changeover switch 60 are pressed manually inward, as shown in FIG. 9*a*. Then the two springs 63 is overcome, and the press buttons 64 are separated from the trigger body 40, and then pushed upward along the lengthwise slots 42 together with the trigger shaft 61 and the trigger inner member 62, as shown in FIG. 9*b*. Then the two press buttons 64 are released to shift outward a little recovering their position by means of the resiliency of the two springs 63, with the two projections 644 engage the upper limit grooves 421 of the trigger body 40 to secure the trigger inner member 62 in the upper space of the trigger body 40, as shown in FIGS. 9*c* and 10. In this position, if a user pulls back the trigger body 40, the safety connect rod 50 moves the trigger inner member 62 to touch the air valve switch 70 for firing a shot once, and at the same time the trigger inner member 62 touches the safety connect rod 50 with a comparatively large area, so the trigger inner member 62 does still not separate from the safety connect rod 50 even if the safety connect rod 50 moves forward to the original position by react ional force of a single shot. So continual triggering of the user can let the safety connect rod 50 press the striking wall and retreat to actuate the trigger inner member 62 to touch the air valve switch 70, forcing the nailing gun fire a shot once again. In this way, continual firing, or striking nails, is carried out.

To mention specifically, the singe-and-continual shot changeover device in the invention has not only a simple structure, but also can be easily handled by the two press buttons 64 possible to be pushed up and down for performing the changeover action, so a user can use two fingers of a same hand to do it before pulling the trigger body 40 for firing, and in addition, the trigger inner member 62 is also possible to be secured stably in its adjustment.

While the preferred embodiment of the invention has been described above, it will be recognized and understood that various modifications may be made therein and the appended claims are intended to cover all such modifications that may fall within the spirit and scope of the invention.

What is claimed is:

1. A single-and-continual shot changeover device for a nailing gun, said device combined with a trigger body of the nailing gun and actuated by a safety connect rod to move and push an air valve switch for firing a shot or striking a nail, said device comprising:

a trigger shaft located in an interior of said trigger body and having a fitting stage formed in an intermediate portion and a slide shaft stage respectively at two sides of said fitting stage:

a trigger inner member having a lower end pivotally fitted around said fitting stage of said trigger shaft and swinging by said safety connect rod to push said air valve switch;

two springs respectively fitting around said two side shaft stages of said trigger shaft and having their inner ends resting against a sidewall of two ends of said fitting stage of said trigger shaft:

two press buttons respectively fitting around said two slide shaft stages of said trigger shaft and having their inner surface resting against an outer end of said two springs, said press buttons respectively possible to be pushed outward by resiliency of said two springs and to be secured stably at one of two lengthwise points of said trigger body, said press buttons then possible to be pressed elastically inward to separate from said trigger body so that said press buttons may be shifted up and down together with said trigger shaft and said trigger inner member and secured at the other of said two lengthwise points, said trigger inner member controlled to separate or not from said safety connect rod so as to change firing a single shot or continual shot.

2. The single-and-continual shot changeover device for a nailing gun as claimed in claim 1, wherein said trigger body has two sidewalls, a lengthwise slide slot respectively formed in each said sidewall, two—one an upper and the other a lower—limit grooves formed at two sides of each said slide slot, said press buttons are provided with a base member to rest against the inner surface of said two sidewalls of said trigger body, each said base member having a projecting member to fit in each said slide slot of said-trigger body and an engage ridge at a side of said projecting member to fit in one of said two limit grooves of said trigger body for limiting said press buttons at one of said two lengthwise points of said trigger body.

3. The single-and-continual shot changeover device for a nailing gun as claimed in claim 2, wherein said press buttons are respectively provided with a hole passing through said base member and said projecting member to fit with said two slide shaft stages of said trigger shaft to enable said press buttons slide on said trigger shaft.

* * * * *